July 12, 1927.
J. SANDILANDS
INDICATING VALVE
Filed Oct. 25, 1924
1,635,349
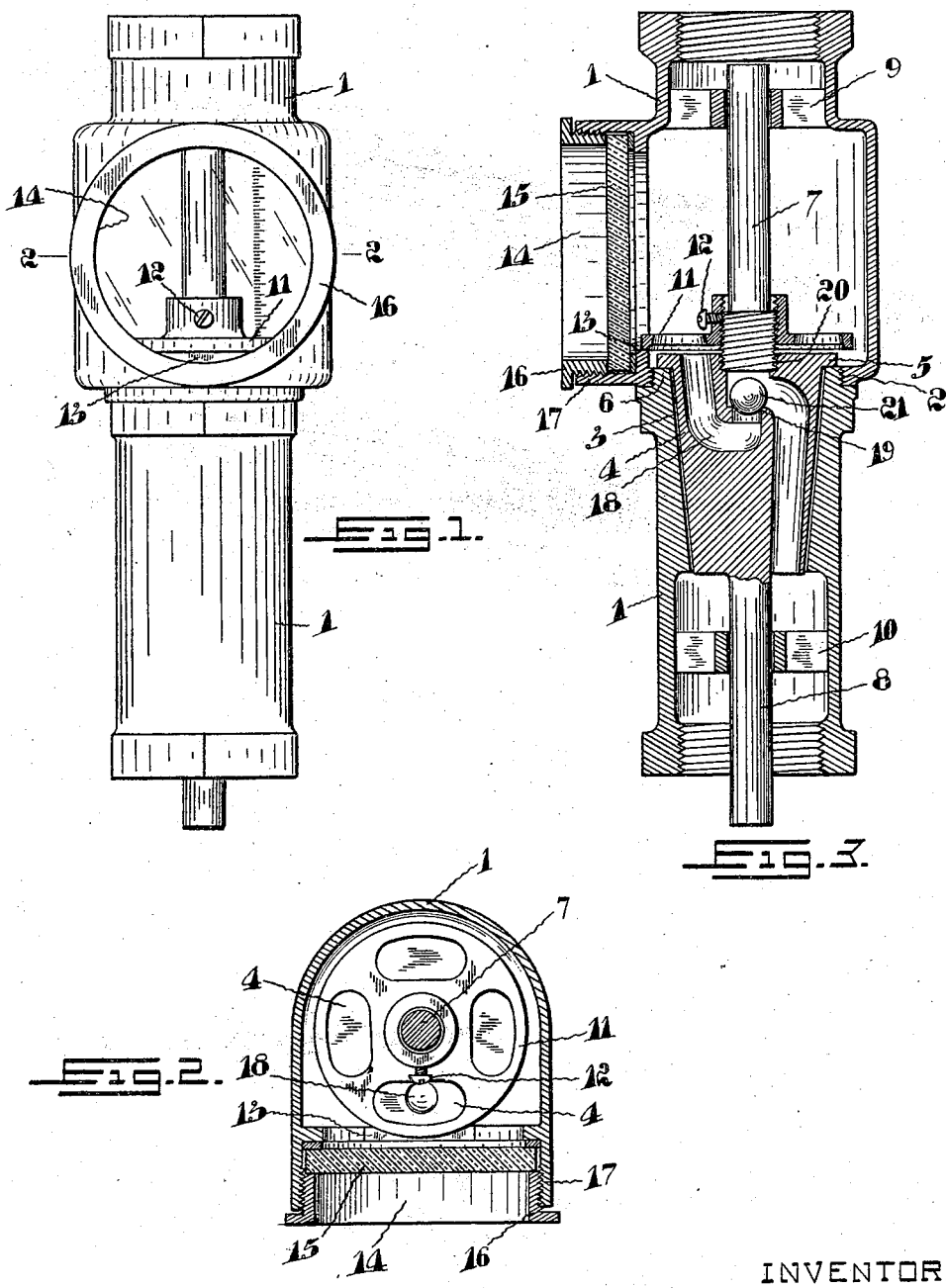
INVENTOR.
J. Sandilands.
BY J. Edward Maybee
ATTY.

Patented July 12, 1927.

1,635,349

UNITED STATES PATENT OFFICE.

JAMES SANDILANDS, OF TORONTO, ONTARIO, CANADA.

INDICATING VALVE.

Application filed October 25, 1924. Serial No. 745,782.

The object of my invention is to devise a valve, which may be inserted in any pipe through which liquid is flowing, adapted to give a visual indication of the rate of flow and adapted to automatically drain the pipe above the valve when the flow ceases and the pipe below the valve drains back.

I attain my object by means of the constructions hereinafter described and illustrated in the accompanying drawings in which Fig. 1 is a front elevation of my improved valve;

Fig. 2 a cross section of the same on the line 2—2 in Fig. 1; and

Fig. 3 a longitudinal section of the same.

In the drawings like numerals of reference indicate corresponding parts in the different figures.

1 is the valve casing, which is preferably formed in two parts, threaded together as indicated at 2 in Fig. 3. In the lower part of the casing is formed a valve seat 3 with which is adapted to co-operate the valve plug 4. The valve plug and valve seat are preferably of the frusto conical form shown, so that longitudinal movement of the valve plug relative to the seat results in a gradual increase in the area of the opening between the two. The valve plug is preferably provided with an annular flange 5, forming a shoulder adapted to engage a shoulder 6 formed at the upper side of the valve seat 3. These shoulders preferably engage while a small space is still left between the tapered surface of the plug and the seat. For example, the diameter of the plug at any plane of cross section may be 1/64 of an inch less than the diameter of the valve seat in the same plane.

From the valve plug extend stems 7 and 8, the stem 7 being guided in a guide 9 formed as a spider cast in the upper part of the valve casing, while the stem 8 is guided in a similar formed guide 10 cast in the lower part of the valve casing. The stem 8 is cast with the valve plug, while the stem 7 is removable for purposes which will hereinafter appear.

An indicator 11 is secured to the stem 7 and is longitudinally adjustable thereon. Preferably this indicator is formed as a disk threaded on the lower part of the stem and provided with a set screw 12, whereby it may be clamped after it has been adjusted by rotating it on the stem. The indicator extends adjacent to and preferably over a ledge 13 cast in the casing and forming a datum line. An opening 14 is formed in the front of the casing which is closed by a glass plate 15, held in place by a ring 16, threaded into an annular flange 17 surrounding the opening 14. The position of the indicator relative to the datum line is thus readily visible at any time from the front of the valve. To facilitate observation, the rim of the indicator and the front edge of the ledge forming the datum line are enamelled white.

From the construction described, it follows that an upward flow through the valve casing will result in the lifting of the valve plug, and the extent of the rise will be proportionate to the rate of flow, thus the position of the indicator relative to the datum line serves at any time to indicate the rate of flow of fluid through the valve. It is important that, in the event of cessation of flow and the drainage of the lower part of the pipe line in which the valve may be connected, that the upper parts of the line and of the valve casing should also be drained, I therefore form a passage 18 through the valve plug 4, which passage is so designed as to present an upwardly facing valve seat 19 in axial alinement with the valve plug and the stem 7. Immediately over the valve seat is a threaded opening 20 in axial alinement with the valve seat and into this opening is screwed the lower end of the valve stem 7. Through the opening, before the valve stem is screwed in position, is introduced a ball 21 which co-operates with the seat to form a check valve, which prevents direct flow through the passage, when pressure exists below the valve plug, but which readily permits back flow in the event of a negative pressure existing below the valve plug.

In connection with the device a visible scale may be employed, and I have indicated such an index on the glass plate 15 closing the opening on the front of the valve.

What I claim is:—

1. In a valve, the combination of a valve casing having a valve seat formed therein and an indicator chamber above the seat; a valve plug movable, more or less, relative to said seat and against the force of gravity by flow through the casing; a ledge on the casing forming a datum mark; a disk forming an indicator secured to and above the valve and extending adjacent to the said ledge; and a window in the wall of the indicator chamber through which the said disk and datum mark are visible.

2. In a valve, the combination of a valve casing having a valve seat formed therein and an indicator chamber above the seat; a valve plug movable, more or less, relative to said seat and against the force of gravity by flow through the casing; a stem extending up from the valve; a guide in the casing for said stem; a ledge on the casing forming a datum mark; a disk forming an indicator adjustable lengthwise of the stem and extending adjacent to said ledge; and a window in the wall of the indicator chamber through which the said disk and datum mark are visible.

Signed at Toronto, Canada, this 9th day of October, 1924.

JAMES SANDILANDS.